United States Patent [19]

Lindgren et al.

[11] 4,116,603
[45] Sep. 26, 1978

[54] APPARATUS FOR CORRUGATING A WEB OF SHEET MATERIAL

[75] Inventors: Ake Lindgren, Vällingby; Sven Lindahl, Spånga, both of Sweden

[73] Assignee: Aktiebolaget Carl Munters, Sollentuna, Sweden

[21] Appl. No.: 855,975

[22] Filed: Nov. 30, 1977

Related U.S. Application Data

[63] Continuation of Ser. No. 691,195, May 28, 1976, abandoned.

[30] Foreign Application Priority Data

Jul. 4, 1975 [SE] Sweden .............................. 7507719

[51] Int. Cl.² ........................................... B29C 15/00
[52] U.S. Cl. .................................. 425/370; 425/396; 425/369; 264/286
[58] Field of Search ............... 425/369, 396, 370, 366, 425/373; 264/286

[56] References Cited

U.S. PATENT DOCUMENTS

| | | | |
|---|---|---|---|
| 1,804,661 | 5/1931 | Wagner | 425/370 |
| 1,828,869 | 10/1931 | Larson | 425/373 X |
| 3,586,591 | 6/1971 | Munters et al. | 425/396 X |
| 3,648,624 | 3/1972 | Verhoeven | 425/373 X |
| 3,776,679 | 12/1973 | Hegler | 425/396 X |

*Primary Examiner*—Robert L. Spicer, Jr.

*Attorney, Agent, or Firm*—Eric Y. Munson

[57] ABSTRACT

The present invention relates to an apparatus for corrugating a web of sheet material in a continuous process by means of an elongated mold movable in an endless closed path and composed of plate elements disposed in a row the one behind the other and in one straight portion together constituting a forming table having preferably diagonally extending, mutually parallel, grooves.

The plate elements are by means of journals supported on and mounted in driving members disposed on either side of the path and equipped with turning wheels, the individual plate elements following the driving members with the same side facing upwards during the whole trave along the closed path.

The primary field of application of the product manufactured in the apparatus are corrugated sheet pieces intended to form the fill in contact or exchanger bodies for two fluids, of which one may be a liquid, such as water, and the other a gas, such as air. Examples of such fields of application are cooling towers, moistening devices, gas cleaners, apparatus for biological purification of water and the like devices. Apparatus of this kind are disclosed e.g. in the U.S. Pat. No. 3,470,280 and U.S. patent application No. 450,531 filed Mar. 12, 1979, now U.S. Pat. No. 3,969,473, according to which the web of sheet material to be corrugated may consist of paper such as of cellulose or asbestos, or of plastic material.

5 Claims, 5 Drawing Figures

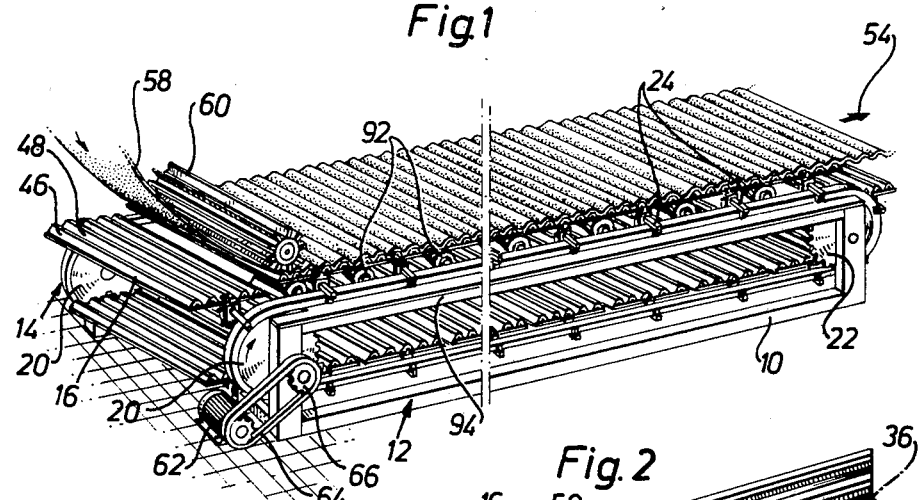
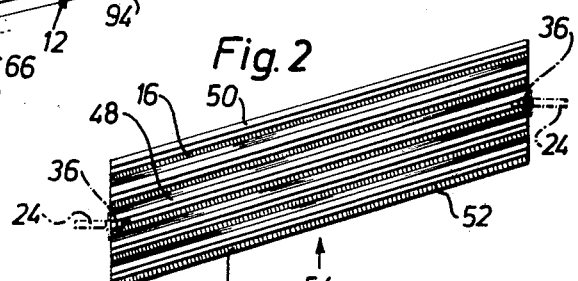
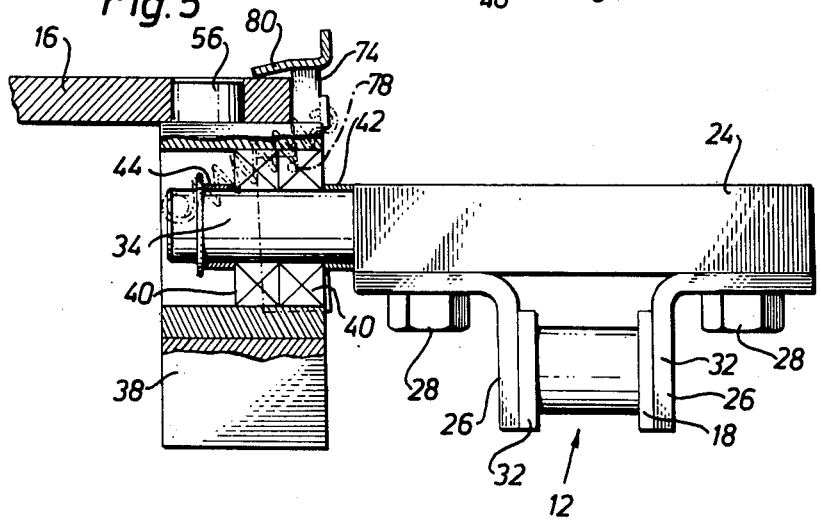

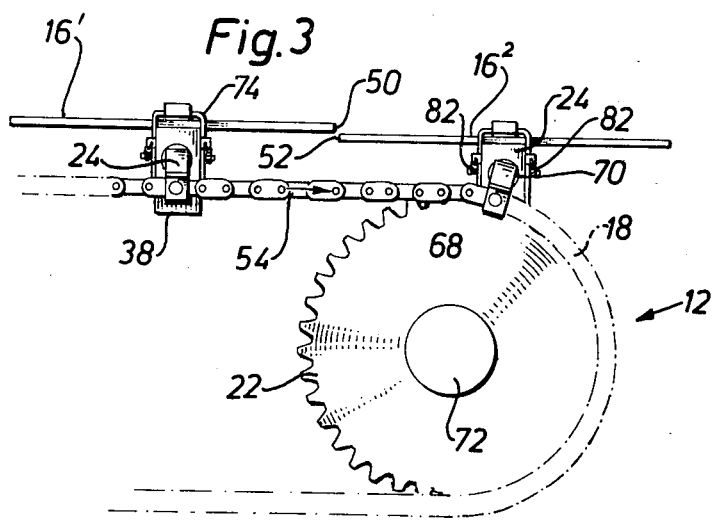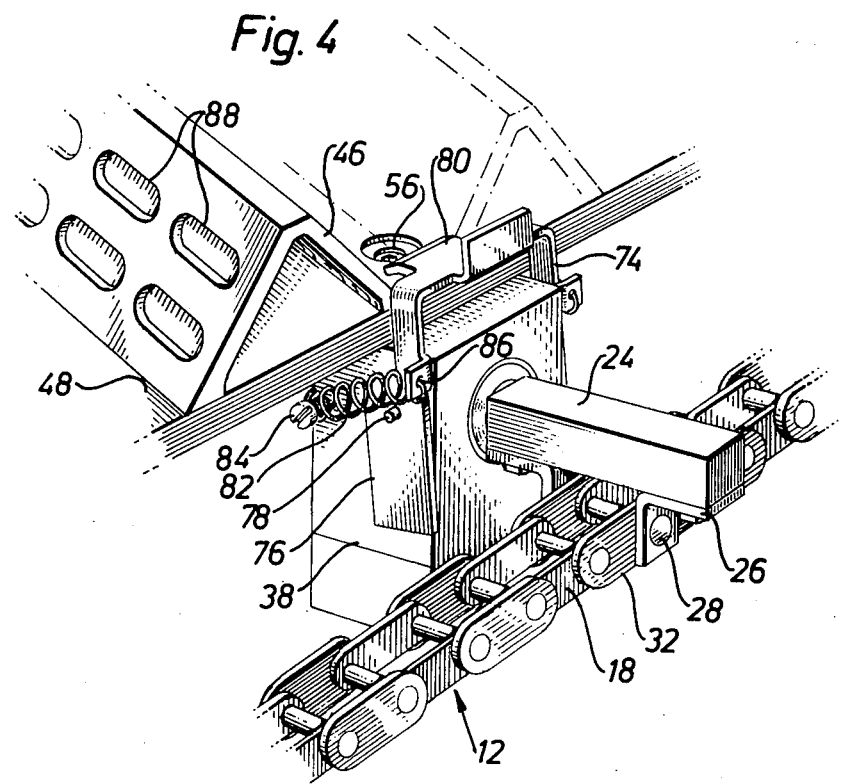

APPARATUS FOR CORRUGATING A WEB OF SHEET MATERIAL

This is a continuation of application Ser. No. 691,195 filed May 28, 1976, now abandoned.

The forming plate elements are advanced in the cloth path in such a manner that they in an upper portion of said path together form a horizontal table on which the corrugating of the sheet material and subsequent processing steps, such as drying, hardening, or cooling, are effected. The return of the plate elements to the inlet side of the table is effected, according to the U.S. Pat. No. 3,470,280 by guiding the plate elements one after the other downwards and carrying them on a lower level than the plane of the table back to the inlet side where they are guided upwards and adjusted to said table plane.

Diagonally corrugated sheet material pieces have proved to be especially suited in contact or exchanger bodies for the purposes indicated above. In this connection the grooves of the plate elements are made so that they extend diagonally, i.e. obliquely, to the direction of travel of the web in the forming table. In the U.S. Pat. No. 3,819,453 it has been suggested to give the plate elements rhomboidic shape so that their fore and rear edges extend in parallel to the diagonal grooves. In this manner the various plate elements can be aligned one behind the other with more precision than compared with plate elements of rectangular shape, so that the corrugated web of sheet material is imparted as far as possible the same form of the corrugations at the transitions between the individual plate elements as otherwise and thus formation of creases and discontinuations in the manufactured web of sheet material is avoided.

One main object of the invention is to provide a simplified and improved device for advance of the plate elements along the entire endless path. This object is realized substantially thereby that each plate on either side has one journal only which extends perpendicularly to the direction of travel of the web, but that said two journals are displaced relatively to one another in said travel direction and that the driving members also are displaced relatively to one another in the longitudinal direction of the web in a similar manner as the journals, so that the plate element by the journals and the driving members is forced both under the movement along the straight portion of the path and in the turning positions adjacent the turning wheels are to take a position parallel to said straight portion of the path.

According to the invention the plate elements during the whole cycle can be jointed by their journals with the endless driving members and at the same time it is made sure that said plate elements always maintain a parallel or horizontal position although they are supported by one journal only on each side. By the mutual displacement of these journals and the direction of their axes relative the direction of travel of the forming table, the plate elements are guided positively so that they cannot take an inclined position, which also holds true in the transition zone to, and from, the upper straight path portion. Special, more or less complicated guide means to prevent the web of sheet material from becoming damaged by tipping of the plate elements thus are not required.

In order to prevent the transition between two plate elements in the upper forming table from becoming traced on the web of sheet material when being corrugated, the fore and rear edges of the plate elements must be positioned tightly adjacent one another so that no gap whatever is formed between the plate elements. When one plate reaches the end of the forming table and begins to move downwards about the turning wheels, the horizontal component of its movement becomes slightly reduced, whereas the subsequent plate element is advanced with unchanged horizontal speed of movemet. If now the plate elements are in direct contact with one another, the rear plate element will be forced against the preceding plate element whereby they can be deformed and thus damaged. This drawback is eliminated thereby that the journals with their axes are located on a greater radius from the centres of the turning wheels than the radius of engagement of the driving members with these wheels to compensate for the reduced horizontal component of the movement when the plate elements in the two end zones of the path change their height position.

Due to the fact that the plate element is swingably mounted on journals which are positioned at a greater distance from the centre of the turning wheels than are the driving members, formed as driving chains, for example, that plate element which begins to be conducted downwards is imparted an increased horizontal component of movement so that it slightly increases its spacing from the plate element behind. The same holds true also at the inlet side to the upper forming table, though in reverse order, so that the upwards moving plate element in the final phase is moved more rapidly than in a direction towards the plate element located ahead on the forming table until said two plate elements are brought to tight contact with their adjacent edges.

The invention shall hereinafter be described in more detail with reference to an embodiment shown by way of examples in the accompanying drawings, other features characterizing the invention being indicated in this connection also.

FIG. 1 is a perspective view of a forming apparatus constructed according to the invention, parts of the same which are thought to be of importance for clarification of the invention, being omitted.

FIG. 2 is a top view of a plate element belonging to the apparatus shown in FIG. 1, the position of its journals indicated also in the Figure.

FIG. 3 is a diagrammatic view of a portion of the forming table and of the apparatus shown in FIG. 1 and its driving members represented in a greater scale.

FIG. 4 is a perspective view of the same portion as in FIG. 3.

FIG. 5 is a cross-sectional view of a plate element and the bearing and driving members thereof.

Referring now to the drawings and in particular FIG. 1, reference numeral 10 denotes a base frame in which two elongated driving members generally designated 12 and 14, respectively, are mounted in spaced relationship and support forming plate elements 16. Each of these driving members comprises an endless chain 18 which at the ends is positioned about a sprocket wheel 20 and 22, respectively, the teeth of which the link elements of the chain are in engagement. Journals 24 are in spaced relationship relative one another rigidly connected with their associated driving chains and links 32, e.g. by means of brackets 26 and screws 28, as is best apparent from FIG. 5. These journals extend perpendicularly to the direction of travel of the chains 18. Inside the chains the journals 24 have the shape of bearing shafts 34 which extend into bearing boxes 38 and bearings 40, such as roller bearings, housed in said boxes. The bearings 40 fix the axial position of the bearing boxes 38 by means of a spacing sleeve 42 or a cover 44 and at the same time permit a swinging movement between bearing box and journal.

The forming plate elements 16 have ridges or folds 46 separated from one another by grooves or valleys 48 which extend diagonally relatively to the longitudinal direction of the forming table. The plate elements have rhomboidic shape so that their fore and rear edges 50 and 52, respectively, seen in the direction 54 of movement, are parallel to the ridges and grooves. Each plate element is supported by two journals 24 only, one on each longitudinal edge, which journals, according to the invention, with their bearing axes 34 are displaced relatively to one another seen in the direction of travel of the plate elements indicated by the arrow 54. In addition, the driving members 12, 14 also are displaced relatively to one another in the travel direction 54, so that both journals of a plate element always are on the same level when they during one revolution pass about the turning wheels 20, 22.

The plate elements 16 are connected with the bearing boxes 38 by means of pivots 56 provided at the top side of the boxes, as best is apparent from FIG. 5. The bearing boxes are in turn, as mentioned, swingable about the bearing axes 34. The plate elements 16 are disposed so tightly adjacent one another that they during the passge over the upper straight portion of the driving members form a coherent forming table on which the forming of the corrugations of the web of sheet material is effected in a manner which is evident from the above mentioned patent specifications and which, therefore, shall not be described here in more detail. As will be seen from FIG. 1 a web 58 of sheet material is conducted downwards towards the coherent forming table constituted by the plate elements 16 at the one end of the apparatus and is corrugated between the plate elements and a forming head 60. Thereafter, the freshly formed corrugations are retained in the grooves of the plate elements until they have received final shape or been stabilized, and the corrugated web leaves the table at the opposite end of the apparatus. In connection therewith the apparatus, in accordance with the disclosure in the patent specifications referred to, is equipped with devices for forming under vacuum or drying or cooling of the web of sheet material, which devices are not shown in FIG. 1 in order to improve clarity. During this treatment, known per se, the plate elements are with their fore and rear edges 50, 52 in contact with one another to constitute the continuous forming table.

The endless driving members 12, 14 for the forming plate element 16 are driven from the turning wheels 20 which are located at the inlet side to the upper forming table, i.e. the region where the plate elements are transferred from the lower to the upper straight portion of the path. In FIG. 1, reference numeral 62 denotes a driving motor, which over a transmission 64 and a pinion 66 drives the sprocket wheel 20 located here. Each of the driving members can be driven syncronously by the motor through a gear mechanism. Due to this position of the driving motor, the plate elements 16 will be forced against one another in the upper straight portion of the path which assists in keeping them in contact with one another, so that the forming track will remain free from slots or gaps, which otherwise would be traced on the web of sheet material during the corrugation thereof.

Referring now to FIG. 3, a forming plate element 16$^1$ is shown in that position in which it approaches the turning position, but still is driven by the upper horizontal straight portion of the endless driving members 12, 14. The preceding element 16$^2$, however, has reached the position in which it begins to become lowered and its conveying journals 24 are positioned opposite to the downwards rotating periphery of the sprocket wheels 22. It is easily understood that the speed of movement of the chains 18 which is constant all over the circumference of the sprocket wheels, is now divided up into a horizontal component and a vertical component or, with other words, the sprocket wheel 22 engages the chain in a point 68 which moves slower in the horizontal direction than before because it is lowered at the same time. The subsequent plate 16$^1$, to the contrary, has unchanged horizontal speed of movement. Now, according to the invention, by positioning the bearing journal to point 70, i.e. on a greater radius from the centre 72 of the sprocket wheel 22, the plate element 16$^2$ is imparted an accelerated horizontal component of movement, so that this plate is brought to a slight spacing from the plate element 16$^1$. Hereby it is made sure that the plate elements as long as they serve as forming table can lie tightly abutting one against the other, and in spite thereof are prevented in the turning position from becoming forced against one another so that no undesired deformations can be produced.

Due to the fact that the bearing journals 36 are displaced in relation to one another in the direction of movement as well as the sprocket wheels 20, 22, the individual plate element always is guided positively so that it moves parallely to itself and thus cannot tip during its travel along the active upper straight portion of the path or in the turning positions. The plate elements are returned to the inlet side of the apparatus along the lower straight portion of the path and thereafter imparted the same accelerated movement in horizontal direction which this time means that the plate element is displaced more rapidly in the horizontal direction just before it reaches the upper forming table plane and in this way forced to bear tightly against the preceding plate element.

The same driving chains 18 and journal spacings can be used for plate elements having different diagonal angles. The only difference will become that the journals will be attached to the lateral edges of the plate element at different places. In FIG. 2 the journals 24 are shown to be located centrally on the parallel lateral edges of the plate element 16. If the diagonal angle is greater or minor, the plate element will be connected to the journals nearer to, or farther from, the fore edge 50 of the plate on one side and nearer to, or farther from, the rear edge 52 on the other side.

The plate elements are fixed in relation to the driving members by means of the pivots 56 as mentioned above. They may at the same time be locked in vertical direction by means of yokes 74, which with shanks 76 clasp the sides of each of the bearing boxes 38, within which they are mounted turnable about pins 78. Each yoke has a tongue 80 which locks the plate element 16 (see FIG. 5), the yoke being kept in locking position by means of one spring member 82 each on either side of the yoke. The spring member 82 is fixed with its one end 84 in the bearing box and with its other end in flanges 86 formed on the yoke 74. These spring members are mounted adjacent the bearing pins 78 in such a manner that, when the yoke with its tongue 80 is drawn outwards in order to render possible to replace a plate element, the line of engagement of the spring member 82 passes over to the opposite side of said pins so that the yoke remains in the drawn-out position. Replacement of plate elements can thus be effected by a single person, since return of the yoke into locking position can be done afterwards.

As already indicated above the plate elements are formed with ridges 46 and grooves 48 therebetween which together impart to the web of sheet material the desired corrugated form. Especially when the web of sheet material is of plastic, the ridges may have minor depressions 88 which leave corresponding traces in the web of sheet material when this during the forming treatment or the upper forming table in heated condition is subjected to reduced pressure as is disclosed in U.S. patent application No. 450,531. According to this disclosure there are provided below the forming table one or several vacuum boxes for creating of the reduced pressure. Pressure acting on the forming plate elements 16 as a result of the action of this arrangement is taken up by rollers 92 which may extend perpendicularly to the direction 54 of travel of the web to be corrugated on the table and which with the ends are mounted in upper horizontal frame pieces 94 of the base frame 10 on either side of the apparatus. These rollers are at their top approximately on the same level as the upper edge of the vacuum box, so that the plate elements form an upper closure of said box.

Obviously, the invention is not limited to the shown and described embodiment, but can be varied in the widest sense within the frame of the basic idea thereof.

We claim:

1. In an apparatus for corrugating continuously a web of deformable material as it is advanced between a corrugating head and a longitudinally extending forming table comprising a row of abutting corrugating plates which are circulated in closed path by a pair of drive belts each engaging a pair of oppositely disposed pulleys and being spaced from one another for articulately supporting the corrugating plates therebetween, the improvement comprising:
   (a) a journal shaft extending from each of the opposite sides of the corrugating plates transversely to their direction of travel and connecting each of said plates to the adjacent drive belt;
   (b) said journal shafts being offset from one another in their direction of travel to support the corrugating plates on the drive belts in a non-tiltable position; and
   (c) said drive belts being correspondingly offset to provide separate individual movement of the corrugating plates tier-wise about the pulleys in a horizontal face-up position substantially parallel to the upper straight-away portions between the pulleys.

2. The improvement according to claim 1, in which the axes of the journal shafts are spaced from the drive belts so that they will revolve about the pulleys on a longer radius than that of the drive belts to compensate for the reduced horizontal movement component of the corrugating plates resulting from their tier-wise movement about the pulleys.

3. The improvement according to claim 2, in which journal shafts are fixed to a drive chain engaging a pair of oppositely disposed sprocket wheels and form part of the endless belts.

4. The improvement according to claim 3, in which the corrugating plates are detachably connected to bearing boxes which are pivotally connected to the journal shafts.

5. The improvement according to clam 2, in which the means for driving the pulley are located at that side of the apparatus where the corrugating plates move into their forming table position to thereby impart to them a pushing force.

* * * * *